United States Patent
Hao et al.

(10) Patent No.: US 12,467,450 B2
(45) Date of Patent: Nov. 11, 2025

(54) UNLOADING DEVICE AND AIR COMPRESSOR

(71) Applicant: ZF Commercial Vehicle Systems (Qingdao) Co., Ltd., Qingdao (CN)

(72) Inventors: Xiucheng Hao, Qingdao (CN); Haiqiang Yuan, Qingdao (CN)

(73) Assignee: ZF COMMERCIAL VEHICLE SYSTEMS (QINGDAO) CO., LTD., Qingdao (CN)

( * ) Notice: Subject to any disclaimer, the term of this patent is extended or adjusted under 35 U.S.C. 154(b) by 0 days.

(21) Appl. No.: 18/586,046

(22) Filed: Feb. 23, 2024

(65) Prior Publication Data

US 2024/0287982 A1  Aug. 29, 2024

(30) Foreign Application Priority Data

Feb. 28, 2023 (CN) .......................... 202310182880.8

(51) Int. Cl.
| | |
|---|---|
| *F04B 49/03* | (2006.01) |
| *F04B 39/08* | (2006.01) |
| *F04B 39/10* | (2006.01) |
| *F04B 39/12* | (2006.01) |

(52) U.S. Cl.
CPC .................................. *F04B 49/03* (2013.01)

(58) Field of Classification Search
CPC ........ F04B 49/03; F04B 49/00; F04B 49/022; F04B 49/02; F04B 39/106; F04B 39/08; F04B 39/1066; F04B 39/1073; F04B 39/125; B60T 17/002; B60T 17/02; B60T 17/04; B60L 1/003; B60G 17/017; B60G 2500/205; F15B 2211/6309
See application file for complete search history.

(56) References Cited

U.S. PATENT DOCUMENTS

| | | | | |
|---|---|---|---|---|
| 3,934,413 | A | * | 1/1976 | Beiswenger ............ F01N 3/227 60/307 |
| 6,038,856 | A | * | 3/2000 | Knaust .................... B60T 17/02 91/461 |
| 6,318,972 | B1 | * | 11/2001 | Huang ................ F04B 39/1073 137/856 |
| 6,382,939 | B2 | * | 5/2002 | Hashimoto ........... F16K 15/162 417/569 |
| 10,838,438 | B2 | * | 11/2020 | Ratatics .............. F16K 31/1223 |

(Continued)

*Primary Examiner* — Dapinder Singh
(74) *Attorney, Agent, or Firm* — WARNER NORCROSS + JUDD LLP (57) ABSTRACT

An unloading device is applied to an air compressor including a plurality of cylinders, and includes: a plurality of unloading valves, each unloading valve movably covering an unloading hole of one cylinder; an unloading cavity in communication with the unloading hole; an intake cavity in communication with the unloading cavity; and a piston member connected to the plurality of unloading valves by means of a shift fork. In an unloading state, the piston member is capable of driving, by means of the shift fork, the unloading valve to move to uncover the unloading hole, so that air in the plurality of cylinders circulates back and forth through the unloading cavity to make the air compressor enter the unloading state, and the air compressor maintains an optimal unloading state by using the intake cavity in communication with the unloading cavity.

13 Claims, 7 Drawing Sheets

(56) References Cited

U.S. PATENT DOCUMENTS

| | | | |
|---|---|---|---|
| 11,434,896 B2* | 9/2022 | Chamot | F04B 49/022 |
| 2004/0007824 A1* | 1/2004 | Durham | F04B 39/08 |
| | | | 277/456 |
| 2005/0188848 A1* | 9/2005 | Salzman | B01D 53/0415 |
| | | | 96/134 |

* cited by examiner

UNLOADING DEVICE AND AIR COMPRESSOR

CROSS-REFERENCE TO RELATED APPLICATIONS

This application claims priority to and all advantages of Chinese Application No. 2023101828808 filed on 28 Feb. 2023, the contents of which are incorporated herein by reference.

TECHNICAL FIELD

The present invention relates to the technical field of air compressors, and in particular to an unloading device and an air compressor.

BACKGROUND ART

An air compressor may be assembled in a vehicle to provide compressed air energy for a braking system, an air suspension system and the like of the vehicle. The air compressor draws in air through a suction port, compresses the air by a cylinder, and then discharges the compressed air to an air storage tank for later use. The air compressor may enter an unloading state to reduce energy consumption after the pressure of the air storage tank reaches a specified value. At this time, the vehicle sends the compressed air to an unloading control interface of the air compressor to serve as a control signal input for unloading.

The unloading state of the air compressor is implemented by an unloading device. The unloading device includes a piston component, and the piston component moves to uncover an unloading hole of the cylinder, so that the air compressor enters the unloading state.

A current unloading device is usually designed for a single-cylinder air compressor; and when the unloading device is applied to an air compressor with a plurality of cylinders, for example, two cylinders, it is necessary to provide a corresponding unloading device for each cylinder, resulting in a complex structure, a high cost, a low response speed, high energy consumption, and difficulties in controlling the unloading states of the plurality of cylinders in a unified manner.

It should be noted that information disclosed in the above background art section is only used to enhance the understanding of the background of the present invention, and therefore may include information that does not constitute the prior art known to those of ordinary skill in the art.

SUMMARY OF THE INVENTION

In view of this, the present invention provides an unloading device and an air compressor, and a plurality of unloading valves are driven, by means of a shift fork, to move by using one piston member, so as to control unloading holes of a plurality of cylinders. According to the present invention, the unloading device has a simple structure and can synchronously control unloading states of the plurality of cylinders.

According to an aspect of the present invention, an unloading device is provided. The unloading device is applied to an air compressor including a plurality of cylinders, and includes: a plurality of unloading valves, each of the unloading valves movably covering an unloading hole of one of the cylinders; an unloading cavity in communication with the unloading hole; an intake cavity in communication with the unloading cavity; and a piston member connected to the plurality of unloading valves by means of a shift fork. In an unloading state, the piston member is capable of driving, by means of the shift fork, the unloading valve to move to uncover the unloading hole, so that air in the plurality of cylinders circulates back and forth through the unloading cavity.

In some embodiments, the unloading holes of the plurality of cylinders and the plurality of unloading valves are respectively symmetrical with respect to the piston member.

In some embodiments, the unloading device further includes: a valve seat plate covering the cylinder, wherein the unloading hole is formed in the valve seat plate, and the unloading cavity is located on the side of the valve seat plate facing away from the cylinder.

In some embodiments, the shift fork includes a main body portion located in the unloading cavity and abutting against the valve seat plate, the main body portion being provided with a plurality of open slots; and each of the unloading valves has a distal end rotatably connected to the valve seat plate by means of a pin shaft, and a proximal end connected to a pilot pin, the pilot pin extending into the open slot.

In some embodiments, an unloading valve accommodating groove is provided on the side of the valve seat plate facing the cylinder; and an arc-shaped groove is provided in a bottom wall of each of the unloading valve accommodating grooves, and the pilot pin passes through the arc-shaped groove and extends into the open slot.

In some embodiments, the unloading device further includes: a manifold plate covering the valve seat plate, wherein the unloading cavity and the intake cavity are both arranged on the side of the manifold plate facing the valve seat plate, the piston member is arranged in a piston cavity of the manifold plate, and the piston cavity is located on back sides of the unloading cavity and the intake cavity.

In some embodiments, the unloading cavity adjoins the piston cavity, and slideways are provided in adjoining walls of the unloading cavity and the piston cavity; and the shift fork includes a lug boss facing the piston member, the lug boss passing through the slideway and extending into a groove of the piston member.

In some embodiments, the lug boss is formed into a T shape including a horizontal portion and a vertical portion; and the horizontal portion is located in the slideway, and the vertical portion extends into the groove.

In some embodiments, the intake cavity adjoins the unloading cavity; and through grooves are provided in adjoining walls of the intake cavity and the unloading cavity, and the intake cavity and the unloading cavity are in communication with each other by means of the through grooves.

In some embodiments, the piston member includes: a guide pin fixed to a distal end of a piston cavity; and a piston bush movably sleeving the guide pin by means of a spring, the shift fork being connected to the piston bush; when unloading control air is introduced into the piston cavity, the piston bush compresses the spring and moves along the guide pin towards the distal end of the piston cavity.

In some embodiments, a pair of elastic pins are provided at the distal end and a proximal end of the piston cavity; and an end portion of the guide pin and an end portion of the piston bush are respectively limited to the pair of elastic pins.

In some embodiments, an opening at the proximal end of the piston cavity is sealed by a screw plug.

In some embodiments, surfaces of the shift fork and mating components thereof are coated with lubricants, such as an anti-seizure agent and/or an anti-sticking agent.

In some embodiments, the unloading hole and the intake cavity are both in communication with a compression cavity of the cylinder.

According to another aspect of the present invention, an air compressor is provided. The air compressor is equipped with an unloading device as described in any of the above embodiments.

Compared with the prior art, the present invention has at least the following beneficial effects:

according to the unloading device and the air compressor provided by the present invention, the plurality of unloading valves are driven, by means of the shift fork, to move by using one piston member, so as to control the unloading holes of the plurality of cylinders; when the piston member drives, by means of the shift fork, the plurality of unloading valves to move to uncover the unloading holes of the plurality of cylinders, air in the plurality of cylinders circulates back and forth through the unloading cavity to make the air compressor enter the unloading state, and the air compressor maintains an optimal unloading state by using the intake cavity in communication with the unloading cavity; and the unloading states of the plurality of cylinders are synchronously controlled by means of one piston member, the unloading device is made simple in structure, and a quick unloading control response can be acquired by consuming the least unloading control air, so that efficient and low-cost unloading control of the air compressor is realized.

It should be understood that the above general description and the following detailed description are only exemplary and explanatory, and cannot limit the present invention.

BRIEF DESCRIPTION OF THE DRAWINGS

The accompanying drawings herein, which are incorporated into and constitute a part of the description, illustrate embodiments consistent with the present invention and, together with the description, are used to explain principles of the present invention. Obviously, the accompanying drawings described below show merely some of the embodiments of the present invention, and those of ordinary skill in the art would also have obtained other accompanying drawings according to these accompanying drawings without any creative effort.

DETAILED DESCRIPTION OF EMBODIMENTS

Now exemplary implementations will be described more fully with reference to the accompanying drawings. However, the exemplary implementations can be implemented in many forms and should not be construed as being limited to the implementations set forth herein. On the contrary, these implementations are provided to make the present invention thorough and complete, and to fully convey the concept of the exemplary implementations to those skilled in the art.

The accompanying drawings are only schematic illustrations of the present invention, and are not necessarily drawn to scale. In the accompanying drawings, the same reference numerals denote the same or similar parts, and thus the repeated description thereof will be omitted. The terms "first", "second" and similar terms used in the specific description do not denote any order, quantity, or importance, but are merely used to distinguish different components.

It should be noted that the embodiments in the present invention and features of the various embodiments can be combined with each other without conflict.

Figure 1:
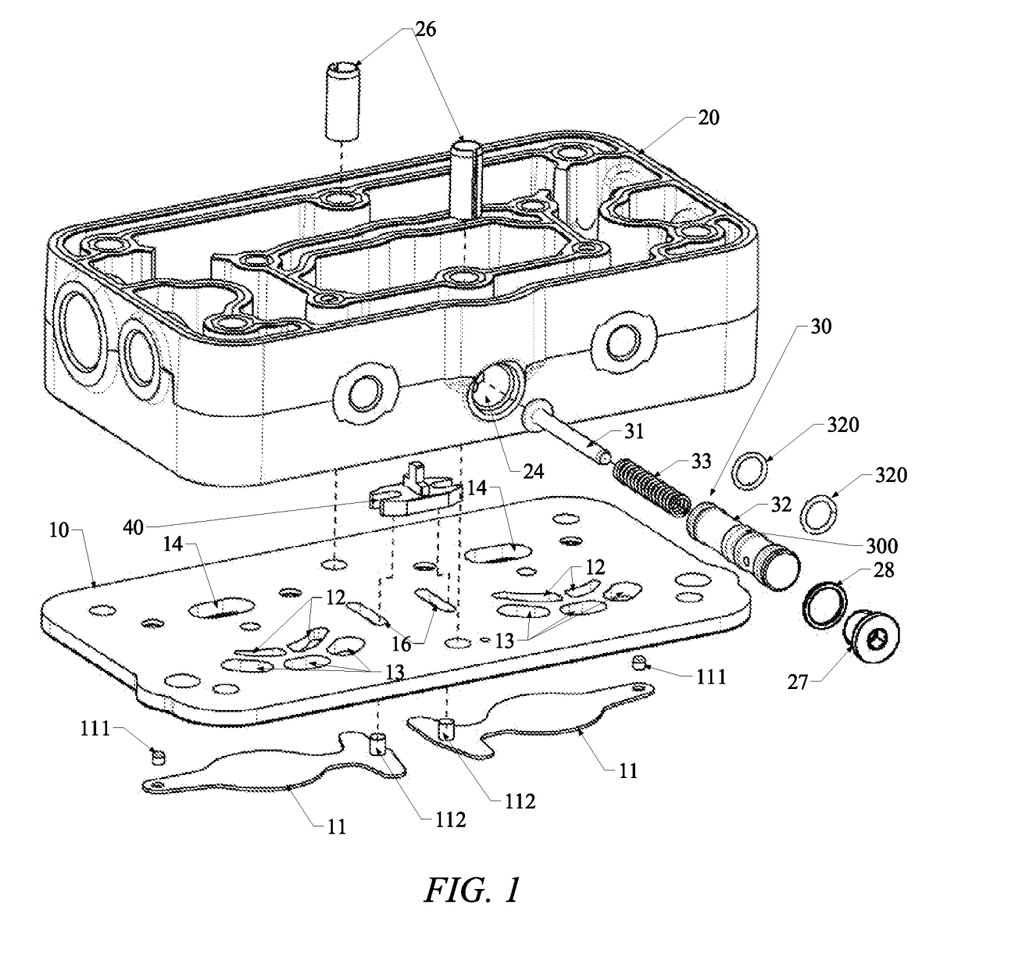
FIG. 1 is a schematic structural exploded diagram of an unloading device according to an embodiment of the present invention.
Figure 2:
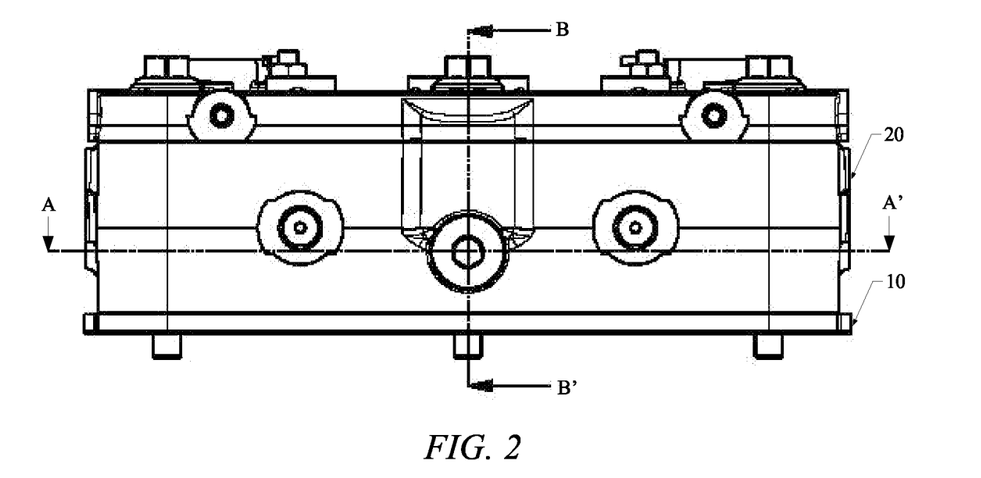
FIG. 2 is a schematic structural front view of the unloading device according to an embodiment of the present invention.
Figure 3:
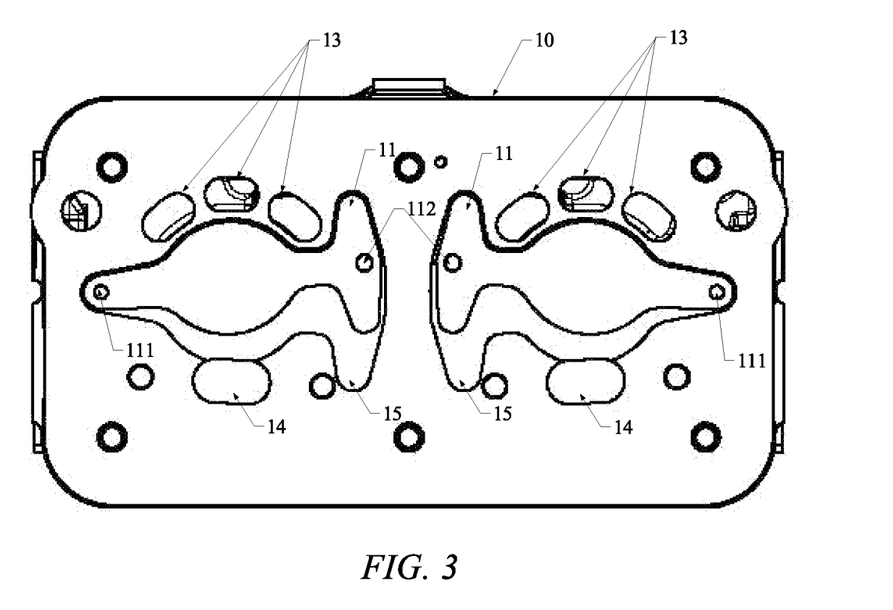
FIG. 3 is a schematic structural diagram of the side of the unloading device facing a cylinder in an inflating state according to an embodiment of the present invention.
Figure 4:
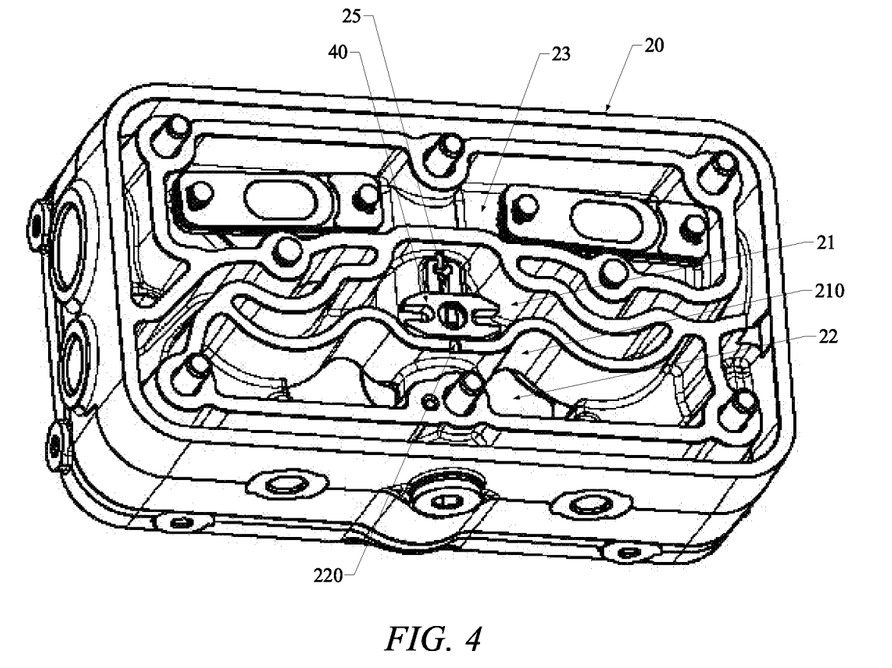
FIG. 4 is a schematic structural diagram of FIG. 3 with an unloading valve and an unloading hole removed.
Figure 5:
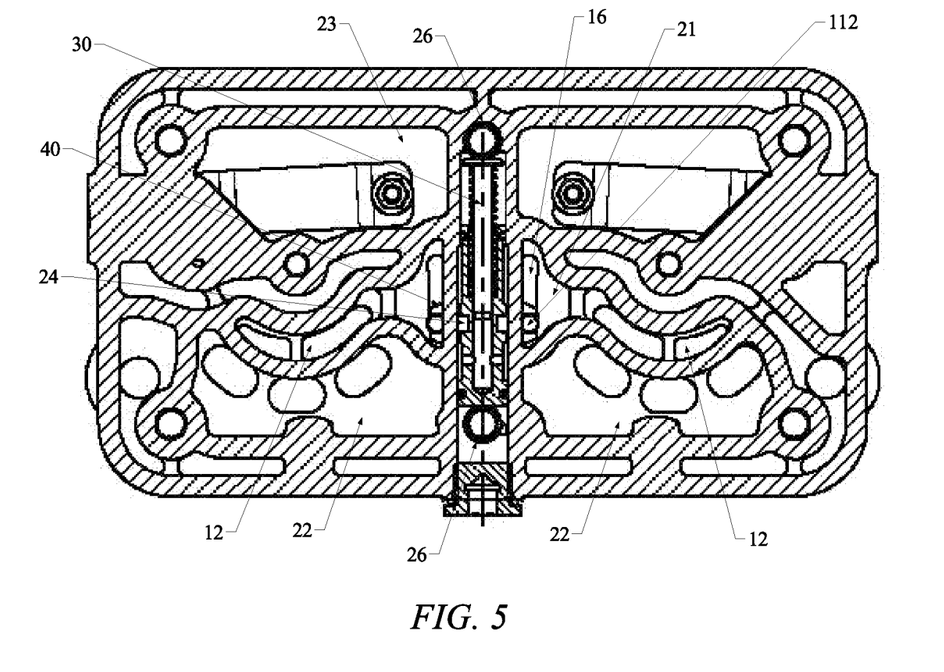
FIG. 5 and FIG. 6 are schematic structural sectional views of the unloading device in an inflating state according to an embodiment of the present invention.
Figure 6:
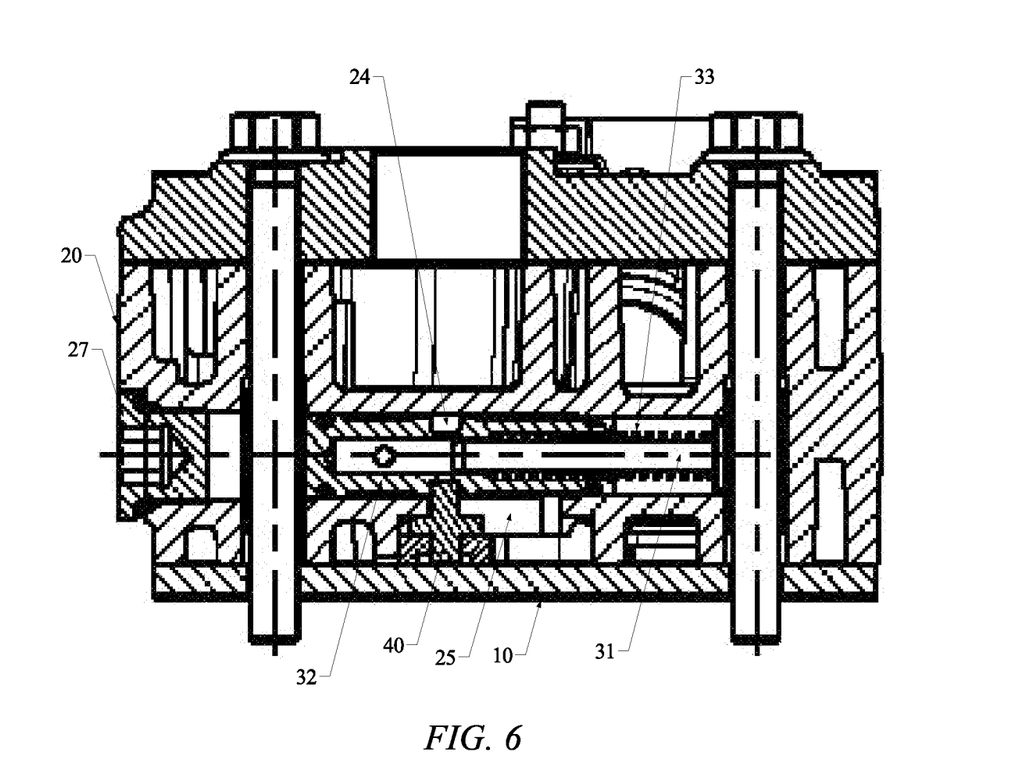
Figure 7:
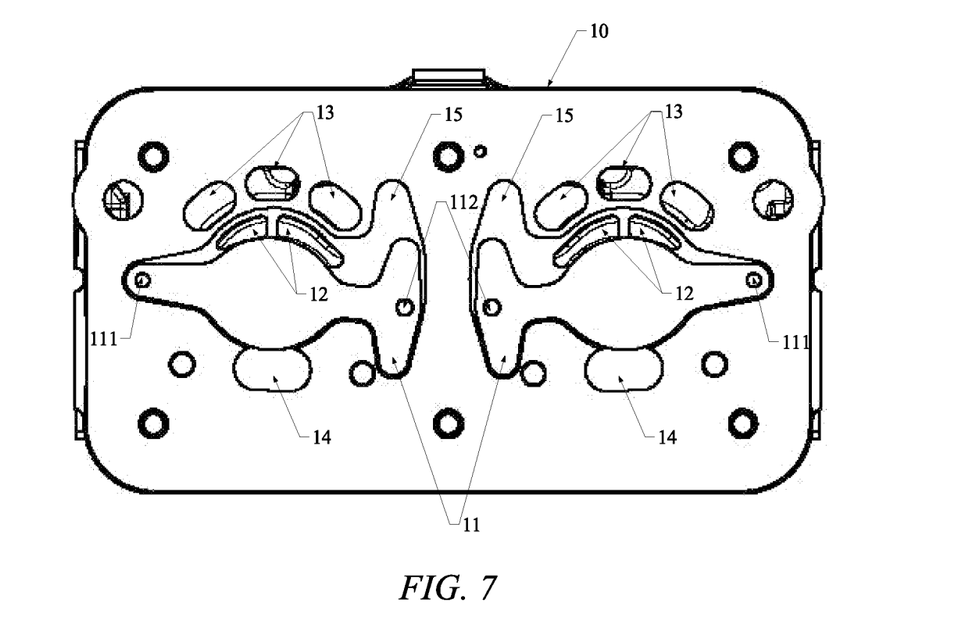
FIG. 7 is a schematic structural diagram of the side of the unloading device facing a cylinder in an unloading state according to an embodiment of the present invention.
Figure 8:
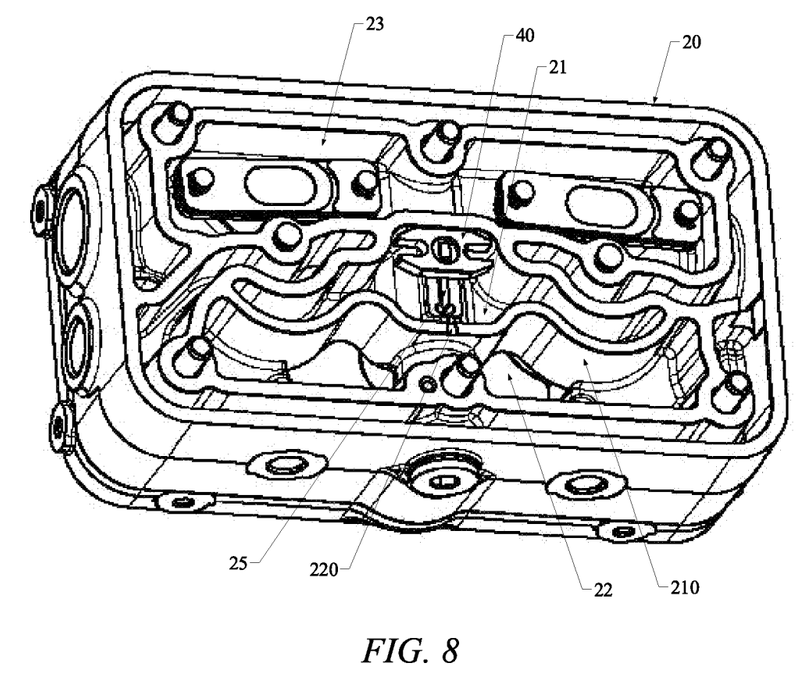
FIG. 8 is a schematic structural diagram of FIG. 7 with an unloading valve and an unloading hole removed.
Figure 9:
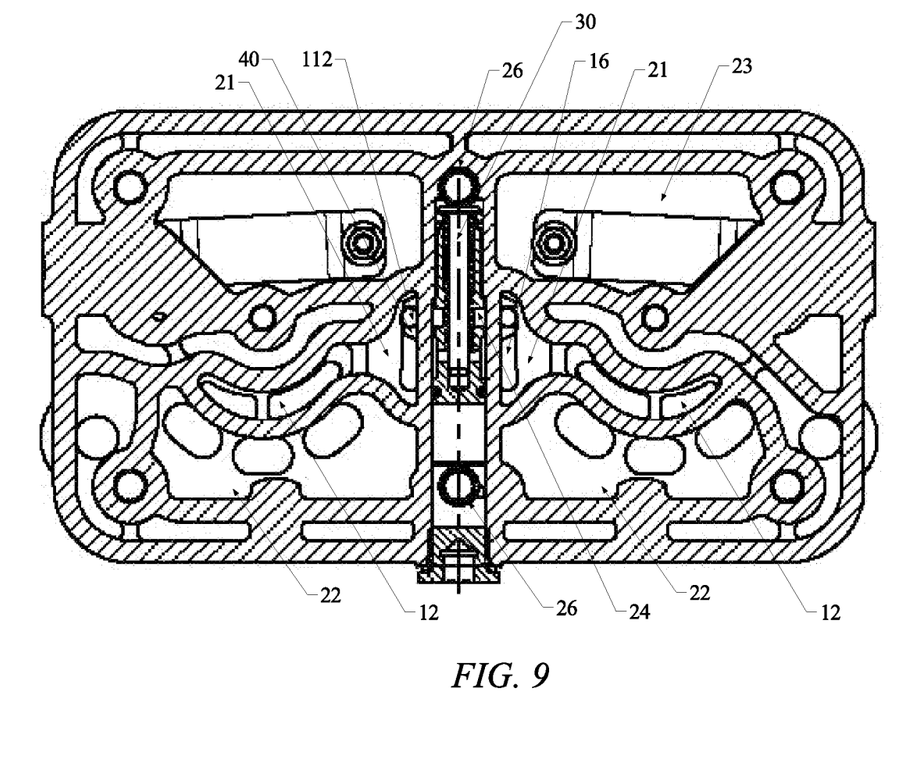
FIG. 9 and FIG. 10 are schematic structural sectional views of the unloading device in an unloading state according to an embodiment of the present invention.
Figure 10:
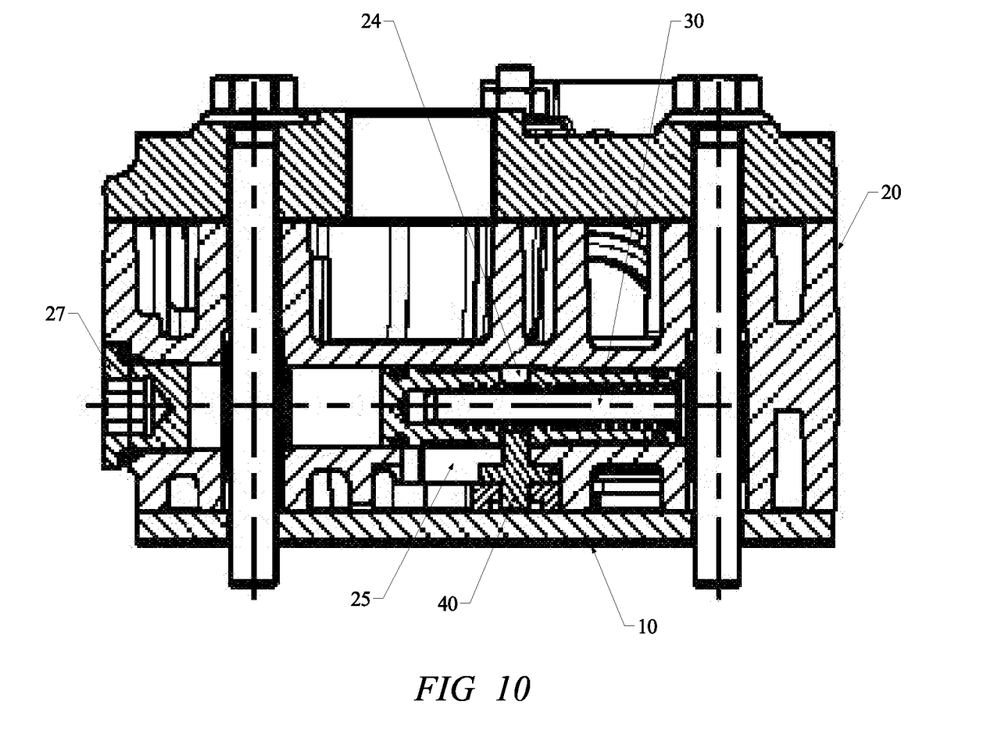

FIG. 1 shows an exploded structure of an unloading device, and FIG. 2 shows a front view structure of the unloading device; FIG. 3 shows a structure of the side of the unloading device facing a cylinder in an inflating state, FIG. 4 shows a structure of FIG. 3 with an unloading valve and an unloading hole removed, and FIG. 5 and FIG. 6 show sectional structures of the unloading device in the inflating state (referring to section line A-A' of FIG. 2 for dissection of FIG. 5, and referring to section line B-B' of FIG. 2 for dissection of FIG. 6); FIG. 7 shows a structure of the side of the unloading device facing the cylinder in an unloading state, FIG. 8 shows a structure of FIG. 7 with an unloading valve and an unloading hole removed, and FIG. 9 and FIG. 10 show sectional structures of the unloading device in the unloading state (referring to section line A-A' of FIG. 2 for dissection of FIG. 9, and referring to section line B-B' of FIG. 2 for dissection of FIG. 10).

As shown in FIGS. 1-10, the unloading device provided by the embodiments of the present invention is applied to an air compressor including a plurality of cylinders, and includes:

a plurality of unloading valves 11, each unloading valve 11 movably covering an unloading hole 12 of one cylinder;

an unloading cavity 21 in communication with the unloading hole 12;

an intake cavity 22 in communication with the unloading cavity 21; and a piston member 30 connected to the plurality of unloading valves 11 by means of a shift fork 40.

In an unloading state, the piston member 30 is capable of driving, by means of the shift fork 40, the unloading valve 11 to move to uncover the unloading hole 12, so that air in the plurality of cylinders circulates back and forth through the unloading cavity 21.

The unloading device shown in FIGS. 1-10 is applied to an air compressor including two cylinders, but the present invention is not limited thereto; and the unloading device according to the present invention may also be applied to an air compressor including a plurality of cylinders, such as three and four.

The unloading hole 12 is in communication with a compression cavity of the cylinder, and the intake cavity 22 is in communication with the compression cavity of the cylinder through an intake hole 13 and an intake valve plate (not specifically shown in the figure). In an inflating (loading) state, the unloading valve 11 covers the unloading hole 12, and the air compressor works normally (air is drawn in through the intake hole 13, compressed by the cylinder, and then discharged through an exhaust hole 14 for a vehicle to reserve for use). In an unloading (no-load) state, the piston member 30 is pushed by unloading control air and drives, by means of the shift fork 40, the plurality of unloading valves 11 to move to uncover the unloading holes 12 of the plurality of cylinders, so that air in the plurality of cylinders circulates back and forth through the unloading cavity 21 without entering an exhaust cavity 23 through the exhaust hole 14.

Taking two cylinders as an example, a reciprocal circulation path of air described above through the unloading cavity 21 is: a compression cavity of a first cylinder→an unloading hole of the first cylinder→the unloading cavity 21→an unloading hole of a second cylinder→a compression cavity of the second cylinder. Air circulates back and forth between the first cylinder and the second cylinder in such a way that one cylinder draws in air, the other compresses the air, and vice versa. Air pressed out by one cylinder provides a certain thrust for air draw-in movement by the other cylinder, which greatly reduces the energy consumption in the unloading state.

In practice, during the process of air circulation in the plurality of cylinders, when one cylinder draws in air, air pressed out by the other cylinder sometimes fails to equal the intake velocity due to the impact from air friction, inertia, etc. Therefore, in the unloading state, a small amount of air is often partially drawn in from the intake hole during reciprocal circulation of air. In the long run, more and more air may be involved in the circulation. Excess air pressure exceeding the opening pressure of an exhaust valve is discharged by the exhaust valve. In this way, the air compressor may be inflated slowly even in the unloading state, which may increase the energy consumption of the air compressor in the unloading state.

According to the present invention, owing to the design that the unloading cavity 21 is in communication with the intake cavity 22, in case of excessively high air pressure of the unloading cavity 21, the design of being in communication with the intake cavity 22 may help the unloading cavity 21 release the pressure and avoid discharging same through the exhaust valve, so that the air compressor maintains an optimal unloading state.

Therefore, the unloading device described above drives, by means of the shift fork 40, the plurality of unloading valves 11 to move by using one piston member 30, so as to control the unloading holes 12 of the plurality of cylinders; when the piston member 30 drives, by means of the shift fork 40, the plurality of unloading valves 11 to move to uncover the unloading holes 12 of the plurality of cylinders, air in the plurality of cylinders circulates back and forth through the unloading cavity 21 to make the air compressor enter the unloading state, and the air compressor maintains an optimal unloading state by using the intake cavity 22 in communication with the unloading cavity 21; and the unloading states of the plurality of cylinders are synchronously controlled by means of one piston member 30, the unloading device is made simple in structure, and a quick unloading control response can be acquired by consuming the least unloading control air, so that efficient and low-cost unloading control of the air compressor is realized.

Further, referring to FIGS. 4 and 8, in some embodiments, the intake cavity 22 adjoins the unloading cavity 21; and through grooves 220 are provided in adjoining walls 210 of the intake cavity 22 and the unloading cavity 21, and the intake cavity 22 and the unloading cavity 21 are in communication with each other by means of the through grooves 220.

The through groove 220 is for example 2 mm in width and 1 mm in depth, which is not limited thereto. Through the through groove 220, the intake cavity 22 and the unloading cavity 21 are in communication with each other, so as to ensure that the air compressor maintains an optimal unloading state.

Continuing to refer to FIGS. 1-10, in some embodiments, the unloading holes 12 of the plurality of cylinders and the plurality of unloading valves 11 are respectively symmetrical with respect to the piston member 30.

The unloading hole 12 of each cylinder may include one or more holes, the unloading holes 12 of the plurality of cylinders are symmetrical with respect to the piston member 30, and the plurality of unloading valves 11 are symmetrical with respect to the piston member 30, so that the unloading holes 12 of the plurality of cylinders may be synchronously uncovered/covered by the plurality of unloading valves 11 along with movement of the piston member 30, thereby realizing synchronous control of the unloading states of the plurality of cylinders.

In addition, the piston movement phase difference of the plurality of cylinders conforms to a preset value, so that intake/exhaust of the plurality of cylinders is staggered to ensure air circulation in the plurality of cylinders. For example, for an air compressor including two cylinders, the piston movement phase difference of the two cylinders is 180°, realizing that when one cylinder draws in air, the other cylinder discharges air, so that air in the two cylinders may circulate back and forth through the unloading cavity 21 without entering the exhaust cavity 23.

Continuing to refer to FIGS. 1-10, in some embodiments, the unloading device further includes: a valve seat plate 10 covering the cylinder, wherein the unloading hole 12 is formed in the valve seat plate 10, and the unloading cavity 21 is located on the side of the valve seat plate 10 facing away from the cylinder.

The valve seat plate 10 facilitates formation of the unloading hole 12, the intake hole 13, the exhaust hole 14 and other slots and holes.

Figure 11:
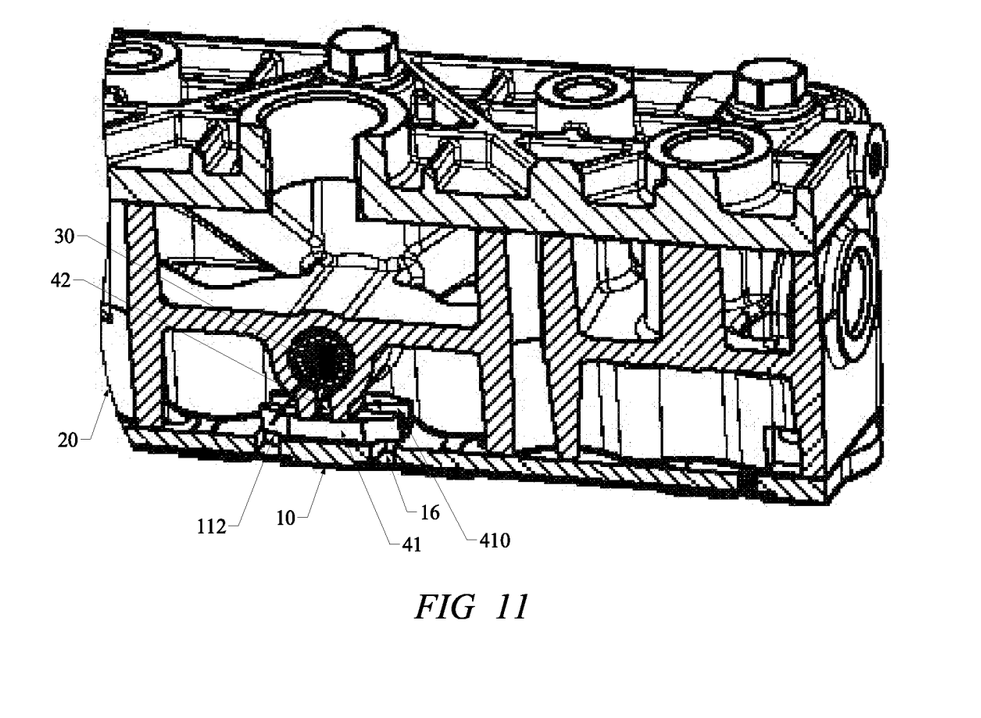
FIG. 11 is a schematic structural sectional view at a shift fork of the unloading device according to an embodiment of the present invention.
Figure 12:
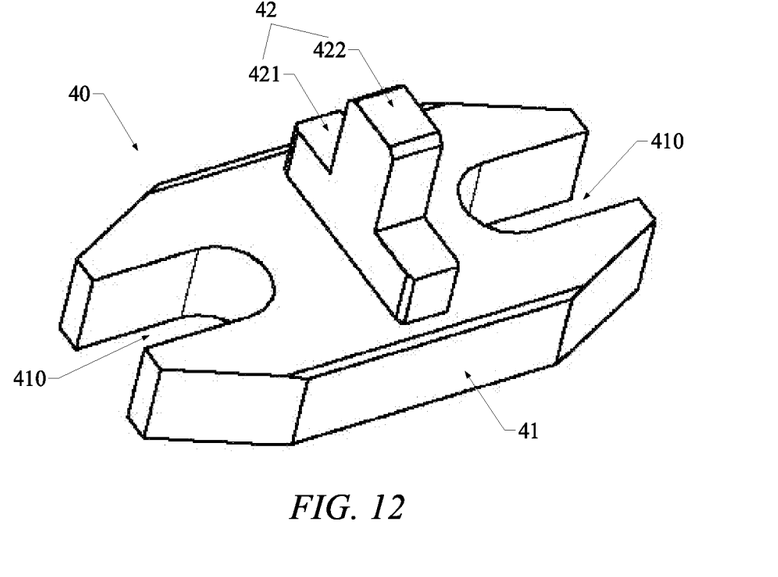
FIG. 12 is a schematic structural diagram of the shift fork according to an embodiment of the present invention.

FIG. 11 shows a sectional structure at the shift fork of the unloading device, and FIG. 12 shows the structure of the shift fork. Referring to FIGS. 1-12, in some embodiments, the shift fork 40 includes a main body portion 41 located in the unloading cavity 21 and abutting against the valve seat plate 10, the main body portion 41 being provided with a plurality of open slots 410. Each of the unloading valves 11 has a distal end (the distal end refers to an end portion of the unloading valve 11 that is distant) rotatably connected to the valve seat plate 10 by means of a pin shaft 111, and a proximal end (the proximal end refers to an end portion of the unloading valve 11 that is in close proximity) connected to a pilot pin 112, the pilot pin 112 extending into the open slot 410.

The main body portion 41 abuts against the valve seat plate 10, so that the shift fork 40 slides stably on the valve seat plate 10 under the drive of the piston member 30. The distal end of the unloading valve 11 is connected to the valve seat plate 10 by means of the pin shaft 111, and the pilot pin 112 connected to the proximal end extends into the open slot 410, so that the unloading valve 11 is driven by the shift fork 40 to rotate to uncover/cover the unloading hole 12.

Continuing to refer to FIGS. 1-12, in some embodiments, an unloading valve accommodating groove 15 is provided on the side of the valve seat plate 10 facing the cylinder; and an arc-shaped groove 16 is provided in a bottom wall of each of the unloading valve accommodating grooves 15, and the pilot pin 112 passes through the arc-shaped groove 16 and extends into the open slot 410.

Each unloading valve 11 is arranged in one unloading valve accommodating groove 15. The unloading valve accommodating groove 15 and the arc-shaped groove 16 formed in the bottom wall thereof play a role in limiting the movement of the unloading valve 11, so that the unloading valve 11 stably cooperates with the shift fork 40, and the unloading valve 11 is accurately controlled along with the movement of the piston member 30. The unloading hole 12 of each cylinder is formed in the bottom wall of the corresponding unloading valve accommodating groove 15 to realize uncovering/covering of the unloading hole 12 along with the movement of the unloading valve 11.

Further, continuing to refer to FIGS. 1-12, in some embodiments, the unloading device further includes: a manifold plate 20 covering the valve seat plate 10, wherein the unloading cavity 21 and the intake cavity 22 are both arranged on the side of the manifold plate 20 facing the valve seat plate 10, the piston member 30 is arranged in a piston cavity 24 of the manifold plate 20, and the piston cavity 24 is located on the back sides of the unloading cavity 21 and the intake cavity 22 and is in communication with the unloading cavity 21.

The manifold plate 20 facilitates provision of the unloading cavity 21, the intake cavity 22, the exhaust cavity 23, the piston cavity 24 and the like.

Figure 13:
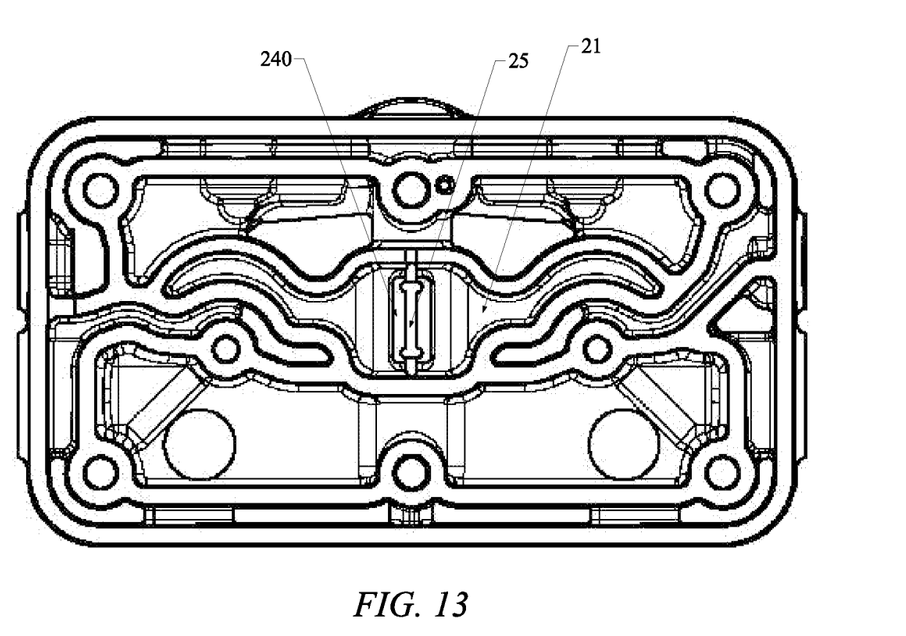
FIG. 13 is a schematic structural diagram of the side of a manifold plate facing a valve seat plate according to an embodiment of the present invention.

FIG. 13 shows the structure of the side of the manifold plate facing the valve seat plate. Referring to FIGS. 1-13, in some embodiments, the unloading cavity 21 adjoins the piston cavity 24, and slideways 25 are provided in adjoining walls 240 of the unloading cavity 21 and the piston cavity 24; and the shift fork 40 includes a lug boss 42 facing the piston member 30, the lug boss 42 passing through the slideway 25 and extending into a groove 300 of the piston member 30.

The lug boss 42 and the main body portion 41 may be integrally formed or connected by means of a mortise and tenon structure and the like. The slideway 25 allows the lug boss 42 to pass through to extend into the groove 300 of the piston member 30, so that the shift fork 40 is connected to the piston member 30 and drives the unloading valve 11 to rotate with the movement of the piston member 30 so as to uncover/cover the unloading hole 12.

In some embodiments, the lug boss 42 is formed into a T shape including a horizontal portion 421 and a vertical portion 422; and the horizontal portion 421 is located in the slideway 25, and the vertical portion 422 extends into the groove 300. Owing to the design that the horizontal portion 421 is limited in the slideway 25 and the vertical portion 422 extends into the groove 300, the shift fork 40 may slide stably along with the movement of the piston member 30. The slideway 25 not only provides good guidance for sliding of the shift fork 40, but also can effectively prevent the shift fork 40 from getting stuck.

Further, referring to FIG. 1, FIG. 5, FIG. 6, FIG. 9 and FIG. 10, the piston member 30 includes: a guide pin 31 fixed to the distal end of the piston cavity 24; and a piston bush 32 movably sleeving the guide pin 31 by means of a spring 33, the shift fork 40 being connected to the piston bush 32. When unloading control air is introduced into the piston cavity 24, the piston bush 32 compresses the spring 33 and moves along the guide pin 31 towards the distal end of the piston cavity 24.

When the system needs the air compressor to enter the unloading state, compressed air, namely, unloading control air, may be input into an unloading control interface of the air compressor to serve as an unloading control signal input. The unloading control air enters the piston cavity 24 through an unloading air path, specifically enters a chamber where the piston bush 32 is located (two end portions of the piston bush 32 are in sealing fit with the piston cavity 24 by means of O-rings 320 respectively), to push the piston bush 32 to compress the spring 33 and drive the shift fork 40 to move, so that the shift fork 40 drives the unloading valve 11 to uncover the unloading hole 12, which makes the air compressor enter the unloading state.

Continuing to refer to FIG. 1, FIG. 5, FIG. 6, FIG. 9 and FIG. 10, in some embodiments, the distal end and the proximal end of the piston cavity 24 are provided with a pair of elastic pins 26; and an end portion of the guide pin 31 and an end portion of the piston bush 32 are respectively limited to the pair of elastic pins 26.

Continuing to refer to FIG. 1, FIG. 5, FIG. 6, FIG. 9 and FIG. 10, in some embodiments, an opening at the proximal end of the piston cavity 24 is sealed by a screw plug 27. The screw plug 27 may be connected, by means of a sealing gasket 28, to the opening at the proximal end of the piston cavity 24 in a sealing manner, so as to seal the piston cavity 24.

In the above embodiments, the surfaces of the shift fork 40 and mating components thereof (including the surface of the valve seat plate 10, the adjoining walls 240, the slideway 25, the groove 300, etc.) are coated with a lubricant to ensure lubrication and pressure resistance between the shift fork 40 and these mating surfaces. The lubricant mentioned includes but is not limited to: an anti-seizure agent, an anti-sticking agent, etc.

An embodiment of the present invention further provides an air compressor. The air compressor is equipped with an unloading device as described in any of the above embodiments. Both the features and principles of the unloading device described in any of the above embodiments may be applied to the air compressor in this embodiment. The features and principles of the unloading device that have been described will not be repeated.

In summary, the air compressor of the unloading device according to the present invention has the following beneficial effects:

the plurality of unloading valves 11 are driven, by means of the shift fork 40, to move by using one piston member 30, so as to control the unloading holes 12 of the plurality of cylinders; when the piston member 30 drives, by means of the shift fork 40, the plurality of unloading valves 11 to move to uncover the unloading holes 12 of the plurality of cylinders, air in the plurality of cylinders circulates back and forth through the unloading cavity 21 to make the air compressor enter the unloading state, and the air compressor maintains an optimal unloading state by using the intake cavity 22 in communication with the unloading cavity 21; and the unloading states of the plurality of cylinders are synchronously controlled by means of one piston member 30, the unloading device is made simple in structure, and a quick unloading control response can be acquired by consuming the least unloading control air, so that efficient and low-cost unloading control of the air compressor is realized.

The above is a further detailed description of the present invention with reference to the specific preferred implementations, and it cannot be considered that the specific implementation of the present invention is limited to these descriptions. For those of ordinary skill in the art of the present invention, several simple deductions or substitutions can be further made without departing from the concept of the present invention, and should be regarded as falling within the scope of protection of the present invention.

What is claimed is:

1. An unloading device, which is applied to an air compressor comprising a plurality of cylinders, the unloading device comprising:
    a plurality of unloading valves, each of the unloading valves movably covering an unloading hole of one of the cylinders;
    an unloading cavity in communication with the unloading hole;
    an intake cavity in communication with the unloading cavity;
    a piston member connected to the plurality of unloading valves by means of a shift fork; and
    a valve seat plate covering the cylinder, wherein the unloading hole is formed in the valve seat plate, and the unloading cavity is located on the side of the valve seat plate facing away from the cylinder;
    wherein the shift fork comprises a main body portion located in the unloading cavity and abutting against the valve seat plate, the main body portion being provided with a plurality of open slots;
    wherein each of the unloading valves has a distal end rotatably connected to the valve seat plate by means of a pin shaft, and a proximal end connected to a pilot pin, the pilot pin extending into the open slot;
    wherein, in an unloading state, the piston member is capable of driving, via the shift fork, the unloading valve to move to uncover the unloading hole, so that air in the plurality of cylinders circulates back and forth through the unloading cavity.

2. The unloading device according to claim 1, wherein the unloading holes of the plurality of cylinders and the plurality of unloading valves are respectively symmetrical with respect to the piston member.

3. The unloading device according to claim 1, wherein an unloading valve accommodating groove is provided on the side of the valve seat plate facing the cylinder; and
    wherein an arc-shaped groove is provided in a bottom wall of each of the unloading valve accommodating grooves, and the pilot pin passes through the arc-shaped groove and extends into the open slot.

4. The unloading device according to claim 1, further comprising:
    a manifold plate covering the valve seat plate, wherein the unloading cavity and the intake cavity are both arranged on the side of the manifold plate facing the valve seat plate, the piston member is arranged in a piston cavity of the manifold plate, and the piston cavity is located on back sides of the unloading cavity and the intake cavity.

5. The unloading device according to claim 4, wherein the unloading cavity adjoins the piston cavity, and slideways are provided in adjoining walls of the unloading cavity and the piston cavity; and
    wherein the shift fork comprises a lug boss facing the piston member, the lug boss passing through the slideway and extending into a groove of the piston member.

6. The unloading device according to claim 5, wherein the lug boss is formed into a T shape comprising a horizontal portion and a vertical portion; and
    wherein the horizontal portion is located in the slideway, and the vertical portion extends into the groove.

7. The unloading device according to claim 1, wherein the intake cavity adjoins the unloading cavity; and
    wherein through grooves are provided in adjoining walls of the intake cavity and the unloading cavity, and the intake cavity and the unloading cavity are in communication with each other by means of the through grooves.

8. The unloading device according to claim 1, wherein the piston member comprises:
    a guide pin fixed to a distal end of a piston cavity; and
    a piston bush movably sleeving the guide pin by means of a spring, the shift fork being connected to the piston bush;
    wherein when unloading control air is introduced into the piston cavity, the piston bush compresses the spring and moves along the guide pin towards the distal end of the piston cavity.

9. The unloading device according to claim 8, wherein a pair of elastic pins are provided at the distal end and a proximal end of the piston cavity; and
    wherein an end portion of the guide pin and an end portion of the piston bush are respectively limited to the pair of elastic pins.

10. The unloading device according to claim 8, wherein an opening at a proximal end of the piston cavity is sealed by a screw plug.

11. The unloading device according to claim 1, wherein surfaces of the shift fork and mating components thereof are coated with an anti-seizure agent and/or an anti-sticking agent.

12. The unloading device according to claim 1, wherein the unloading hole and the intake cavity are both in communication with a compression cavity of the cylinder.

13. An air compressor, the air compressor being equipped with an unloading device according to claim 1.

* * * * *